United States Patent [19]
Kanaji

[11] Patent Number: 4,720,827
[45] Date of Patent: Jan. 19, 1988

[54] OPTICAL COMMUNICATION SET
[75] Inventor: Hideki Kanaji, Kanagawa, Japan
[73] Assignee: Anritsu Corporation, Tokyo, Japan
[21] Appl. No.: 841,899
[22] Filed: Mar. 20, 1986
[30] Foreign Application Priority Data Mar. 26, 1985 [JP] Japan .................................. 60-59469

[51] Int. Cl.[4] ............................................ H04B 9/00
[52] U.S. Cl. ............................................ 370/4; 370/29
[58] Field of Search ...................................... 370/4, 29

[56] References Cited
U.S. PATENT DOCUMENTS

| 2,498,635 | 2/1950 | Bailey | 370/29 |
| 4,049,908 | 9/1977 | Knorpp et al. | 370/29 |

FOREIGN PATENT DOCUMENTS

| 54-114006 | 9/1979 | Japan | 370/29 |
| 58-194434 | 11/1983 | Japan | 370/29 |

OTHER PUBLICATIONS

"The Reports of the Institute of Electronics and Communication Engineers of Japan, the Section of Switching" 1978-72.
"The Reports of the Institute of Electronics and Communication Engineers of Japan, the Section of Communication System" 1983-72.

Primary Examiner—Joseph A. Orsino, Jr.
Attorney, Agent, or Firm—Frishauf, Holtz, Goodman & Woodward

[57] ABSTRACT

In an optical communication set a local transmission equipment, in which a call switch is previously pressed, becomes a master side. The local transmission equipment at the other side automatically becomes a slave side in response to a burst digital signal transmitted from the master side. The master side equipment supervises the transmitting signal and the receiving signal, adds a signal for deciding a sync state in the transmitting signal, and transmits it to the slave side equipment. The slave side equipment detects the sync signal, controls the timing of its transmitting signal, and transmits the signal to the master side equipment, thereby making a communication state of two-way time division optical communication having a predetermined sync relationship. When the transmission call of either side is made, the relationship between the master side and the slave side is established. Since the equipment of the slave side controls its transmitting timing on the basis of the sync information from the master side equipment, two-way time division optical communication can be performed by the same equipments for an optical line having any length, and optimal values of the transmitting level can be set to one another.

15 Claims, 13 Drawing Figures

OPTICAL COMMUNICATION SET

BACKGROUND OF THE INVENTION

This invention relates to an optical communication set and, more particularly, to an optical communication set employing the same devices and equipments at the transmission and reception sides adapted, for example, for a communication by using temporarily laid optical fiber lines or for a test communication utilizing laid optical fiber cables.

An encountering speech test or an announce call order speech test is necessary in installation and maintenance of optical fiber used as transmission media of optical communication.

Figure 1:
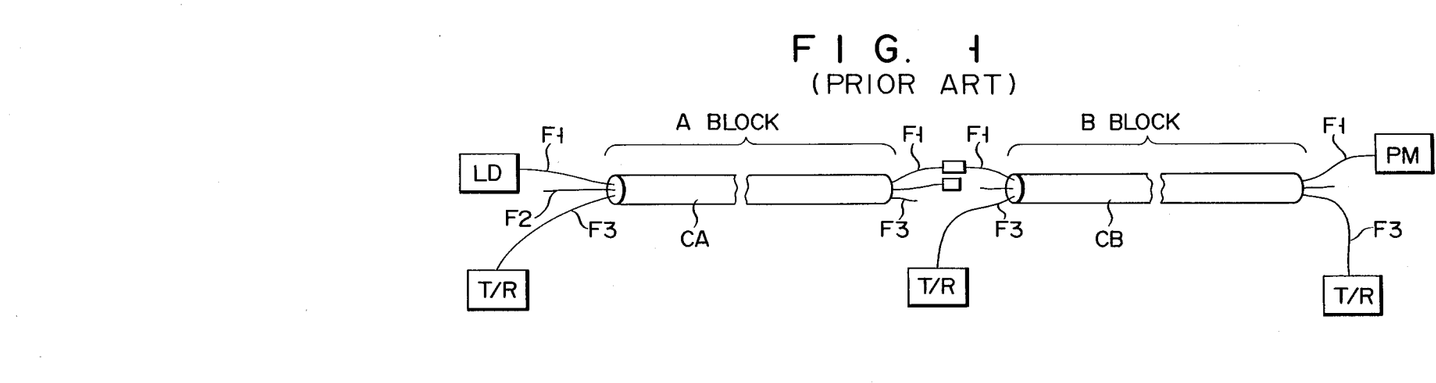
FIG. 1 is a schematic view showing a conventional encounter testing method as has been necessary when connecting an optical cable.

As shown in FIG. 1, assume that optical cables $C_A$ and $C_B$ are laid in adjacent blocks A and B and the optical fibers $F_1$, $F_1$ of the cables $C_A$ and $C_B$ are connected at the contacts in both blocks to each other. A laser light source LD is connected to the optical fiber $F_1$ of the optical cable $C_A$ at the transmission terminal in the block A. Similarly, an optical power meter PM is connected to the optical fiber $F_1$ of the optical cable $C_B$ at the reception terminal of the block B. The optical fibers $F_1$, $F_1$ of the cables $C_A$ and $C_B$ are connected so that the quantity of light from the source LD reaches the maximum value on the power meter PM.

In such a connecting work, at least three people must work at the transmission, reception terminals and connecting place, and they must be enabled to communicate.

Conventionally, these persons can communicate by connecting metallic line pairs (not shown) provided in the cables $C_A$ and $C_B$ to a telephone set. However, the metallic line pairs, which are not necessary except for the test speech, tend to be omitted from the optical cables from an economic viewpoint.

Thus, in case of other optical fibers in the cables $C_A$ and $C_B$ in this laying work such as, for example, as shown in FIG. 1, it is requested to communicate test speech or test data exchange by connecting optical speech transceiver T/R to the optical fiber $F_3$.

A ping-pong transmission system is known as a transmission system for communicating in two ways through an optical line.

Figure 2:
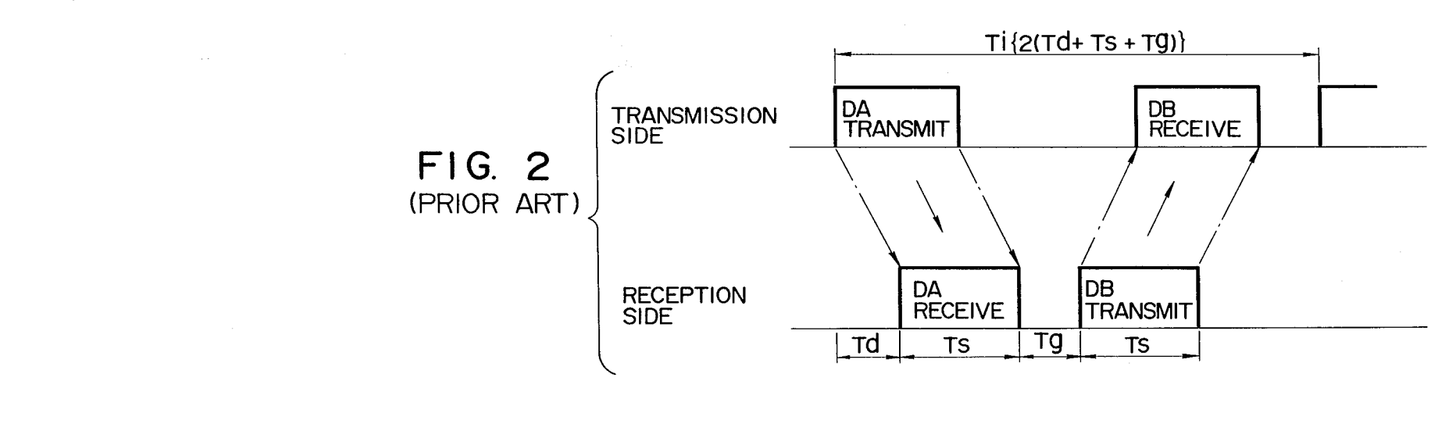
FIG. 2 is an explanatory view of a conventional ping-pong transmission system.
Figure 3:
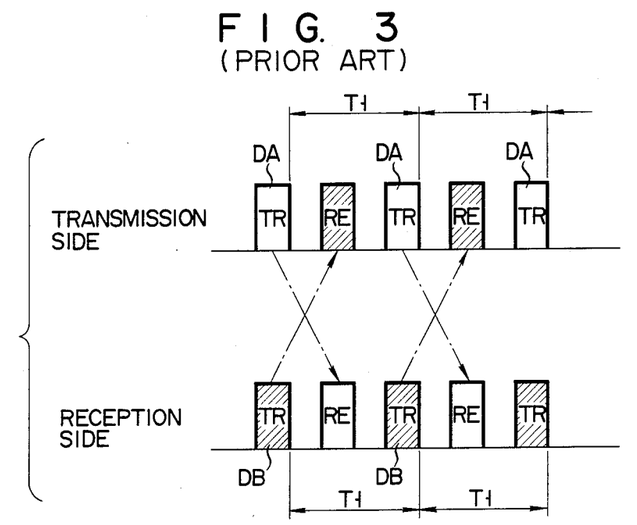
FIG. 3 is an explanatory view of a conventional transmission system employing two metallic lines.

This system is in general a system for alternatively transmitting and receiving pieces of block information $D_A$, $D_B$ compressed in time base at transmission and reception sides as shown in FIG. 2. This system is excellent at the point of eliminating the influence of near-end crosstalk. However, since the information to be transmitted is divided into blocks and transmitted, the longer the transmission line is, the more the delay time Td increases, and the more transmission interval Ti increases. Thus, this system has such a disadvantage that memory having large storage capacity is required. Further, this system has drawbacks that transmission equipment increases in size and becomes expensive.

A digital two-way transmission system employing the existing telephone line, i.e., two metallic lines, has been proposed.

The digital two-way transmission system has a pair of exclusive transmission lines at both transmission and reception sides. This system is set to such timing relation that pieces of information $D_A$, $D_B$ to be transmitted in a burst state at a predetermined interval $T_1$ are not superposed at the transmission and reception terminals. However, the conventional technique is limited to the metallic line pair, and in order to take timing of pieces of information $D_A$, $D_B$ to be transmitted, one channel unit (at telephone station side) is designated as master side, and the other is secured to a speech unit (subscriber's side) at the slave side. However, no actual technique for performing an optical communication system using the same optical communication equipments at both master and slave sides on both transmission and reception sides has been provided. Particularly, no technique for eliminating problems arising from the use of one optical line (not the metallic line pair), such as deterioration of information due to reflection occurring in the optical line or variation in transmission level due to optical lengths, has been invented.

SUMMARY OF THE INVENTION

It is, therefore, an object of the present invention to provide a new and improved optical communication set which can perform the use of the same equipment at both transmission and reception sides and remedy problems arising when commonly using one optical line.

According to the present invention, there is provided an optical communication set comprising:

an optical transmission medium set in an arbitrary optical transmission path length;

a first optical communication terminal station coupled with one end of said optical transmission medium;

a second optical communication terminal station coupled with the other end of said optical transmission medium;

each terminal station comprising:

master-slave designating means for generating designating information for designating self-terminal station to master side and opponent terminal station to slave side at communication starting time at any of said first and second optical communication terminal stations;

transmitting information input means for inputting information to be transmitted to become the master or slave side;

transmitting time setting means for generating first transmitting time setting information at the master side and second transmitting time setting information at the slave side in response to the designating information;

sync supervision information outputting means for outputting sync supervision information indicating whether the first transmitting time setting information of the master side and the second transmitting time setting information of the slave side have a predetermined synchronizing relationship or not in response to the designating information;

composition means for outputting a transmission burst signal of the master or slave side by combining the transmitting information of the master or slave side with the designating information, the first or second transmitting time setting information and the sync supervision information;

optical transmitting and receiving means for converting the transmission burst signal of the master or slave side into an optical signal to transmit the signal to the optical transmission medium, and for converting transmission burst signal due to the optical signal of the slave or master side into an electric signal by receiving the transmission burst signal;

decomposition means for separating the designating information, the transmitting information, the first or second transmitting time setting information and the sync supervision signal contained in the received transmission burst signal of the slave or master side;

first control means for locking the slave-master designating means to a slave state in response to the separated designating information at the slave side;

second control means for varying the second transmitting time setting information of the slave side during a period indicating that the sync supervision information separated at the slave side does not have the predetermined synchronizing relationship;

third control means for judging whether the first transmitting time setting information and the second transmitting time setting information separated at the master side have a predetermined synchronizing relationship ship or not, and for supplying the judged result as the sync supervision information to the sync supervision information outputting means; and receiving information outputting means for outputting the separated transmitting information as a receiving information of the master or slave side.

BRIEF DESCRIPTION OF THE DRAWINGS

These and other objects and features of the present invention can be understood by reference to the accompanying drawings, in which.

DETAILED DESCRIPTION OF THE PREFERRED EMBODIMENT

Figure 4:
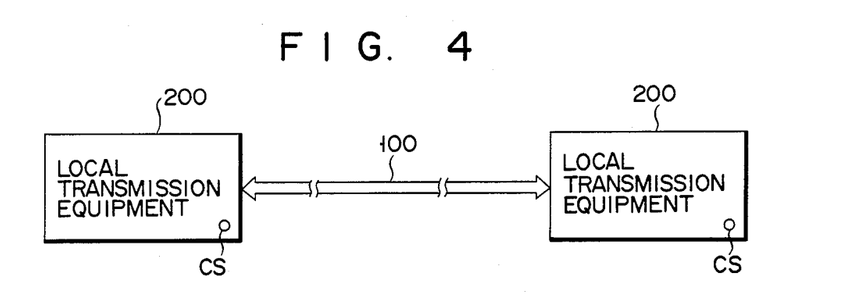
FIG. 4 is a view showing the construction of an optical communication set according to an embodiment of the present invention.

In FIG. 4, reference numeral 100 designates an optical fiber line as an optical transmission medium having a predetermined length. A pair of two-way time division optical communication local transmission equipments 200, 200 constructed in the same configuration are respectively coupled with both ends of the optical fiber line 100.

The details of the local transmission equipments 200, 200 will be described later. Master or slave side is decided according to which of call switches CS provided in both the local transmission equipments is previously operated. Thus, two-way time division optical communication can be performed between both the local transmission equipments in the state that one optical fiber line 100 is commonly provided as will be described.

Figure 5:
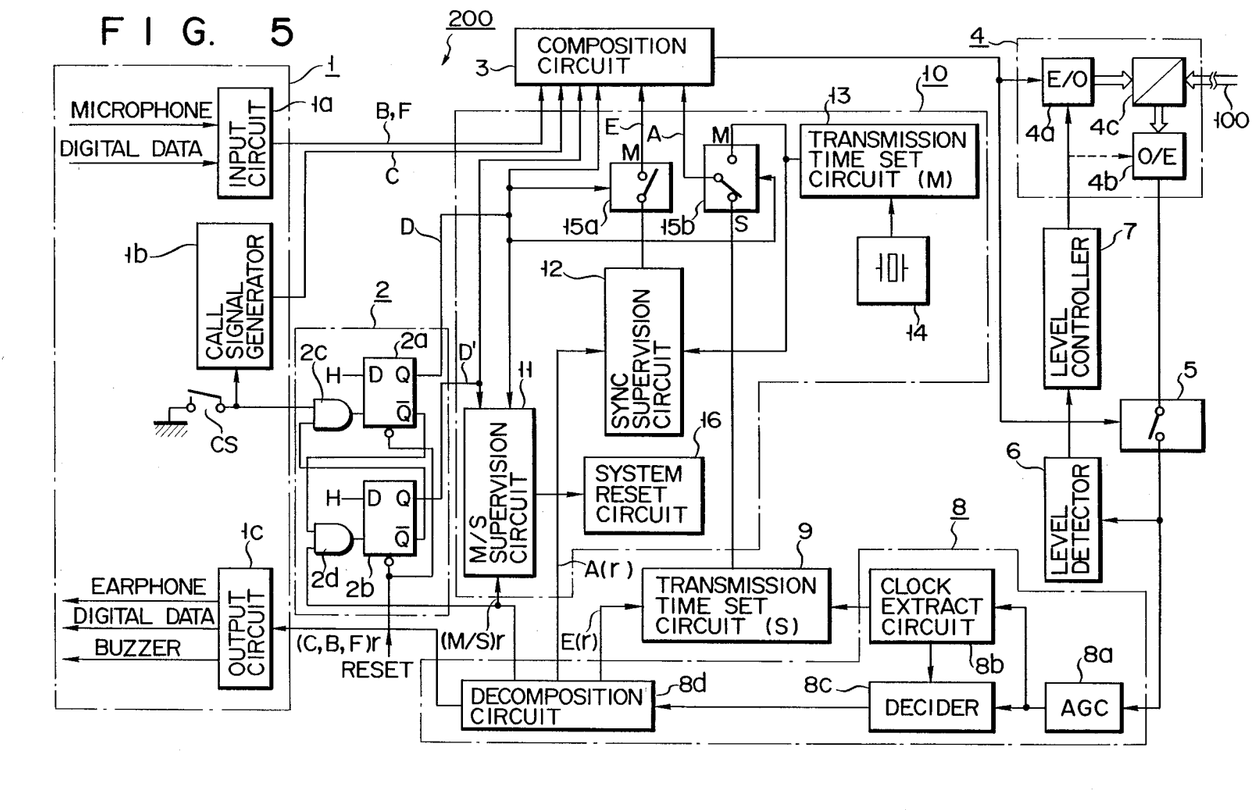
FIG. 5 is a block diagram showing the construction of a terminal station used in the embodiment.

FIG. 5 is a block diagram showing the details of the two-way time division optical communication local transmission equipments 200, 200, wherein both the equipments have the same construction, and only one is accordingly shown.

In FIG. 5, reference numeral 1 surrounded by a dotted chain line designates a signal processor for processing a signal to be transmitted or received. The processor 1 has a transmitting input circuit 1a, a call signal generator 1b, a receiving output circuit 1c and a call switch CS.

Figure 9:
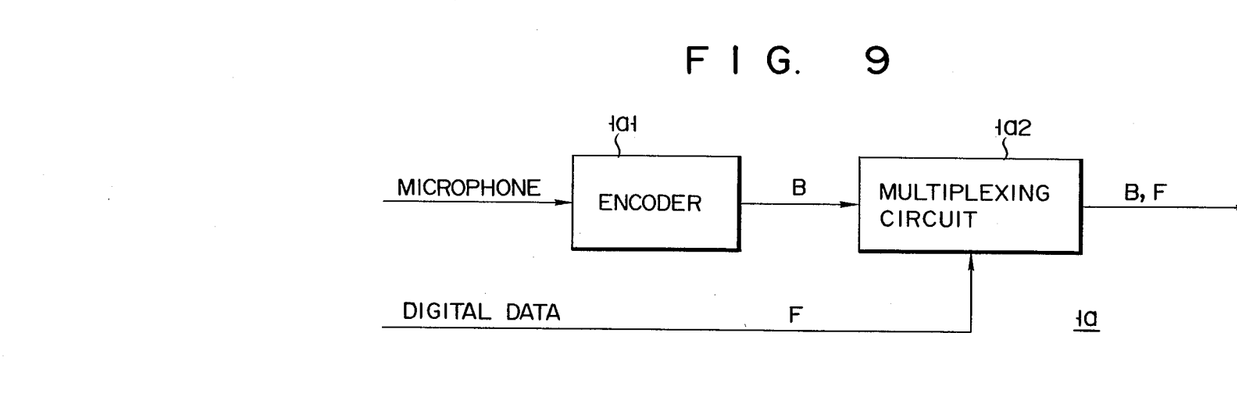
FIG. 9 is a block diagram showing the construction of an input circuit used in FIG. 5.

The input circuit 1a (see FIG. 9) has a plurality of input terminals. The input circuit 1a has an encoder (CODIC IC, e.g., HD44238 made by Hitachi Limited) 1a1 for coding an analog signal (for voice) from a microphone line input to the first input terminal into a PCM signal B, and a multiplexing circuit 1a2 including a shift register (e.g., 74HC164 widely known as 74H-series CMOS logic IC, and similarly referred to below) for combining the PCM signal B and digital data F from an external digital equipment line input to the second input terminal, with a predetermined timing relationship as transmitting information B, F, and a multiplexer (e.g., 74HC151), as shown in FIG. 9.

Figure 10:
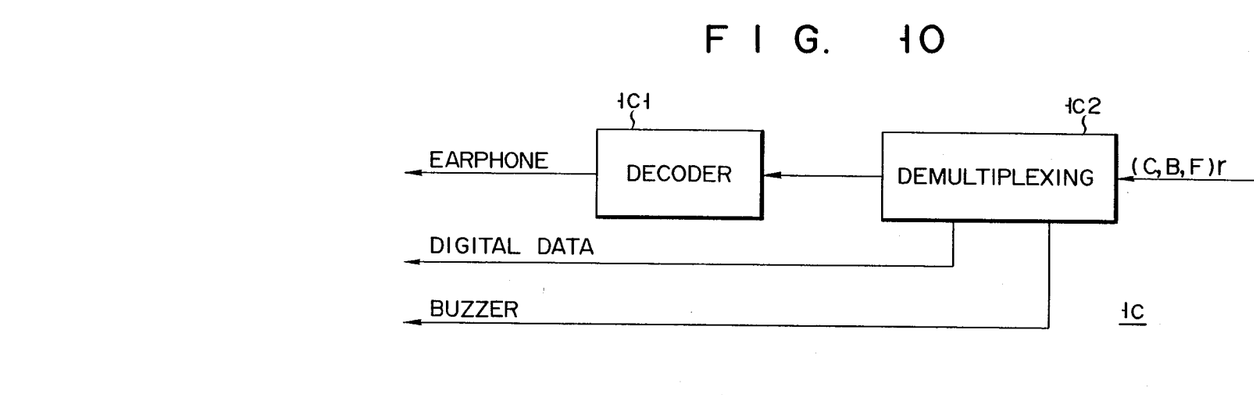
FIG. 10 is a block diagram showing the construction of an output circuit used in FIG. 5.

The output circuit 1c (see FIG. 10) has a demultiplexing circuit 1c1 including a shift register (e.g., 74HC164) for separating the received digital signal into a voice PCM signal and digital data (including a call signal) with a predetermined timing relationship, and an AND gate (e.g., 74HC08) and a D flip-flop (e.g., 74HC074), and a decoder (CODIC IC such as HD44238 made by Hitachi Limited) 1c2 for decoding the separated PCM signal into an analog signal (for voice), as shown in FIG. 10.

The output circuit 1c has a plurality of output terminals, and outputs the decoded analog signal (for voice) from the first output terminal to an earphone line, the separated digital data from the second output terminal to an external digital equipment line, and the call signal from the third output terminal to a buzzer line.

The call signal generator 1b has an OR gate (e.g., 74HC032) for generating a call signal C when the call switch CS is depressed before the other local transmission equipment for the purpose of setting the associated local transmission-equipment to a master side.

Reference numeral 2 surrounded by a dotted chain line designates a master-slave state setter. The setter 2 has D type flip-flops (hereinbelow referred to as "D-F/F") 2a, 2b for setting the local equipment to a master state and the other equipment to a slave state to be described later, by setting in the state that the call switch CS is pressed as described above, and AND circuits 2c, 2d. The D F/F 2a, 2b outputs master-slave set signals D, D' which become 1, 0 when the local equipment is in the master state, 0, 1 when in the slave state, and 0, 0 when in the reset state.

A composition circuit 3 has a shift register (e.g., 74HC164) for combining the transmitted information B, F from the input circuit 1 with various types of pieces of control information (including the call signal C from the call signal generator 1b and master-slave set signals D, D' from the setter 2) to be described later with a predetermined timing relationship and outputting the combined information as a transmission burst signal having a predetermined interval, and a multiplexer (e.g., 74HC151). The interval of the digital burst signals is set to three times or more of the time occupied by the digital burst signal to be described later.

Reference numeral 4 surrounded by a dotted chain line designates an optical transceiver. The transceiver 4 has an electro/optical modulator (hereinbelow referred to as "E/O", e.g., a laser diode) 4a for converting the digital transmission burst signal from the composition circuit 3 into an optical signal to transmit the optical signal to the optical fiber line 100, and an optical directional coupler (e.g., a beam splitter) 4c. Further, the transceiver 4 has an opto/electrical demodulator (e.g., a photodiode, hereinbelow referred to as "O/E") 4b for receiving the optical signal transmitted through the line 100 from the other equipment through the coupler 4c to convert the signal into an electric signal.

The first switch circuit 5 has an analog switch (e.g., 74HC4066) for inhibiting a reception signal from the O/E 4b set to OFF state on the basis of the output from the composition circuit 3, i.e., when the digital transmission burst signal of the associated local equipment is transmitted.

Reference numeral 6 designates an input level detector for detecting the level of a reception signal input when the switch circuit 5 is in an ON state.

Reference numeral 7 designates an output level controller for controlling the E/O 4a and O/E 4b to regulate the transmission output of the local equipment in response to the detected output from the detector 6.

Reference numeral 8 surrounded by a dotted chain line designates a reception signal processor. The processor 8 separates transmission information and various pieces of control information, from a received digital burst signal from the other equipment as supplied through the switch circuit 5. The processor 8 has an AGC amplifier 8a for amplifying the reception signal to a predetermined level, a clock extract circuit 8b for extracting a clock signal from the output of the amplifier 8a, a D-F/F (e.g., 74HC074) to act as a decider 8c for deciding the reception signal on the basis of the clock signal from the extract circuit 8b, and a decomposition circuit 8d for separating the output from the decider 8c into the respective signals on the basis of a predetermined timing. The decomposition circuit 8d has a JK-type F/F (e.g., 74HC107), an AND gate (e.g., 74HC008) and a shift register (e.g., 74HC164).

A transmission time set circuit 9 has a first counter (e.g., 74HC161) for setting the transmitting timing of the digital transmission burst signal to be described later on the basis of a synchronizing signal separated by the decomposition circuit 8d to be described later and the clock signal extracted by the extract circuit 8b, and a second counter (e.g., 74HC193). The set circuit 9 operates in a state when the associated local equipment becomes the slave side to be described later.

Reference numeral 10 surrounded by a dotted chain line designates a controller. The controller 10 has a M/S supervision circuit 11 of a NAND gate (e.g., 74HC00) for monitoring whether the local equipment is the master or slave side on the basis of the master-slave monitor signal (M/S)r detected by the decomposition circuit 8d and the outputs D, D' from the setter 2. The controller 10 further has a sync supervision circuit 12 having a D-F/F (e.g., 74HC074) and a counter (e.g., 74HC163) for supervising whether the own equipment and the other equipment are in synchronizing state or not to be described on the basis of a frame bit (A)r separated by the decomposition circuit 8d. Further, the controller 10 has second and third switch circuits 15a, 15b. The second switch circuit 15a has an AND gate (e.g., 74HC08) equivalently controlled by the output D from the setter 2 to an ON state (M) for supplying the output from the supervision circuit 12 to the composition circuit 3 as a sync signal E. The third switch circuit 15b has a multiplexer (e.g., 74HC153) equivalently controlled to an M contact side when the output D from the setter 2 is "1" for supplying the output from a transmission time set circuit (M) 13 provided in the controller 10, or controlled to an S contact side when the output D is "0" for supplying the output from the set circuit 9 as a frame signal A to be described later to the composition circuit 3. The set circuit (M) 13 has a counter (e.g., 74HC163) provided in the controller 10 for setting the transmitting timing of the digital transmission burst signal on the basis of a clock from a clock generator 14 for generating a clock to the entire system. The output of the set circuit (M) 13 is also applied to the sync supervision circuit 12.

The controller 10 further has a system reset circuit 16 of an AND gate (e.g., 74HC08) for supplying a reset signal to all the circuit elements (except mere gate elements) upon reception of the output from the M/S supervision circuit 11 in case of the specific state to be described later.

Figure 6:
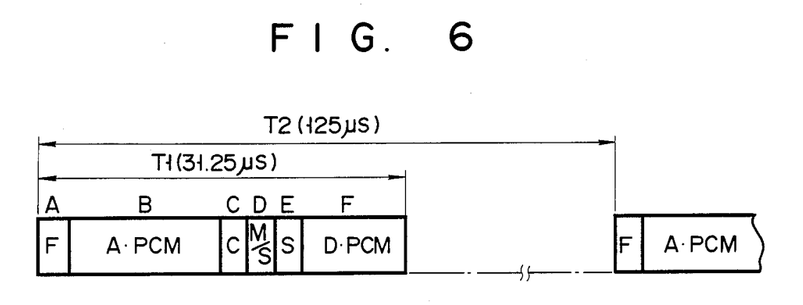
FIG. 6 is a timing chart showing an example of bit configuration of a transmission burst signal used in the above embodiment.

FIG. 6 shows the format of the digital burst transmission signal when communicating in the two-way time division optical communication system according to the present invention. In FIG. 6, reference character A designates a frame bit period showing a start signal and clock bit period (16 bits), reference character B designates an analog signal and a PCM bit period (8 bits) with a PCM signal for voice, reference character C designates a bit period (1 bit) of call signal, reference character D designates a decision bit period (1 bit) of different sign according to whether the local equipment is master or slave, reference character E designates a sync bit period (1 bit) inserted with a sync signal representing whether the sync state is established or not, reference character F designates transmitting information except the analog signal for voice such as data bit period (20 bits) used when there is digital data.

The digital burst signal (hereinbelow referred to "a burst signal") is set at the transmitting time $T_2$ (e.g., 125 $\mu$sec.) by considering the sampling period when the analog signal for voice is used as a PCM signal, necessary control bit and the length of a data signal.

More specifically, FIG. 7A to FIG. 7D show all the cases of the time relationship that the burst signal $D_S$ transmitted from the slave side arrives at the equipment of the master side with respect to the burst signals $D_{m1}$, $D_{m2}$, ..., transmitted from the master side.

In FIG. 7A to FIG. 7D, $D_{m1}'$, $D_{m2}'$ designate signals of the master side reflected at the slave side, i.e., the reflected waves, and it is preferred that the reflected waves $D_{m1}'$, $D_{m2}'$ are not superposed with the transmitting burst signal $D_S$ of the slave side.

To this end, the transmitting burst signal $D_S$ of the slave side may be delayed in transmission at a time of $T_d$ from the reflected waves $D_{m1}'$, $D_{m2}'$.

Figure 7A:
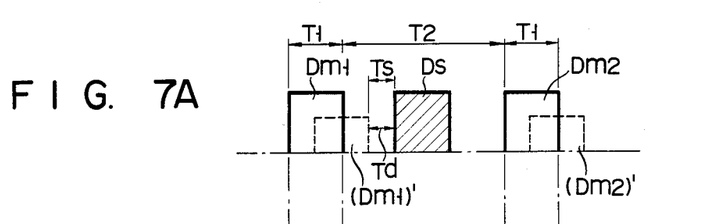
FIGS. 7A to 7D are explanatory views for setting transmitting interval of the transmission burst signal.
Figure 7B:
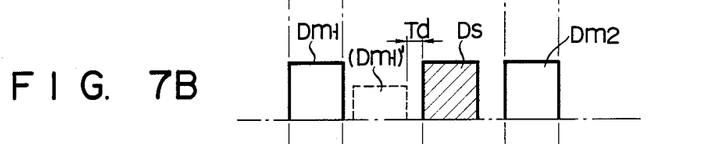
Figure 7C:
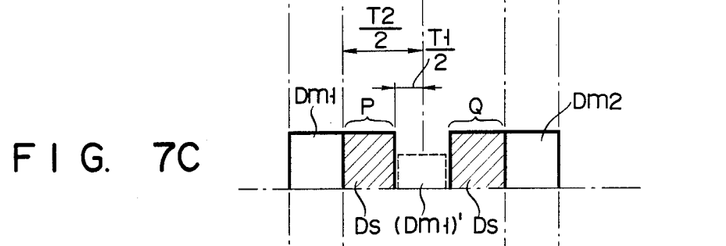
Figure 7D:
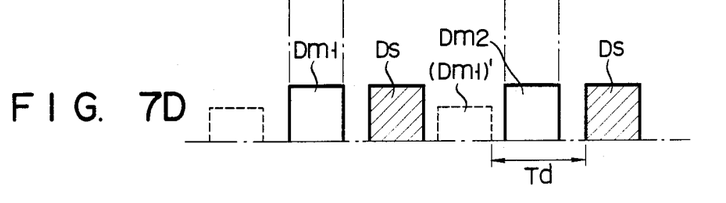

In this case, as shown in FIG. 7C, the case of the line length that the reflected wave $D_{m1}'$ exists at an intermediate point of the burst signals $D_{m1}$, $D_{m2}$ of the master side becomes the worst condition. However, in order that the transmitting burst signal $D_s$ from the slave fall within the range designated by P and Q of FIG. 7C, $(T_2/2)-(T_1/2)>T_1$. Eventually, the transmitting interval $T_2$ in the equipment used in this system and the length $T_1$ of the burst signal may become at least $T_2>3T_1$.

Therefore, when the interval time $T_2$ is, for example, set to 125 μsec., preferable two-way time division optical communication can be performed in response to all line length if 31.25 sec. or ¼ of $T_2$ is set to the transmitting time $T_1$.

The transmitting and receiving timings of the two-way time division optical transmission system according to the present invention thus constructed as described above will be explained with reference to FIG. 8.

Figure 8:
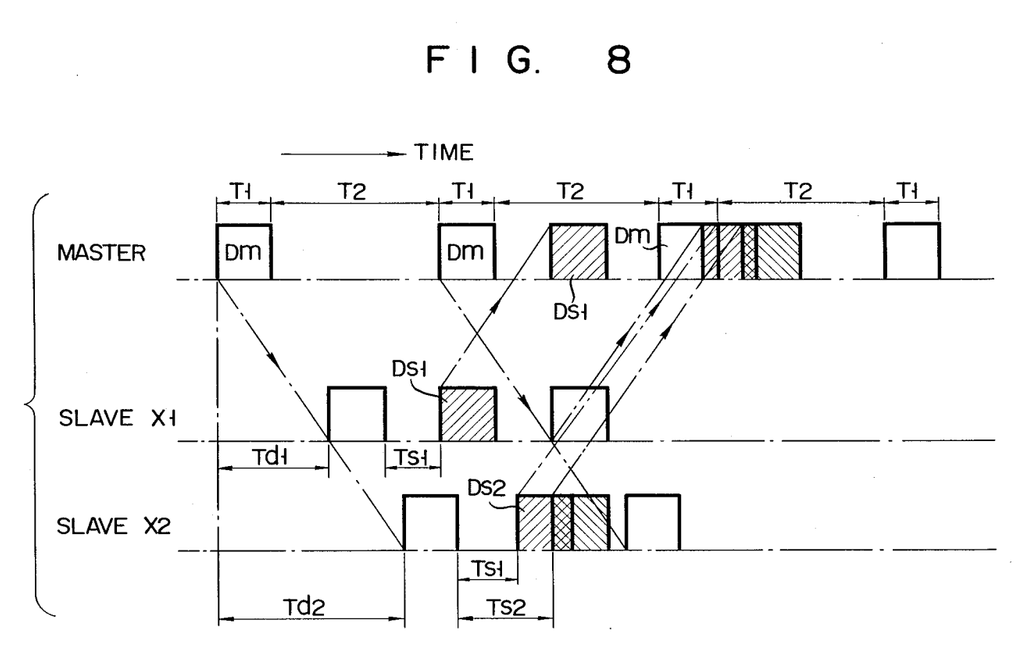
FIG. 8 is an explanatory view showing the relationship between the transmission burst signal and the reception burst signal used in the above embodiment.

When the burst signal time shown in FIG. 6 is set to $T_1$ and the transmitting interval is set to $T_2$, a burst signal $D_m$ of the period shown in FIG. 8 is transmitted from the equipment (master side) or calling side. This burst signal $D_m$ arrives at the equipment (slave side x1) or opponent side after the delay time $T_{d1}$ of the optical fiber line 100. Therefore, when the burst signal $D_{s1}$ is transmitted from the equipment of the slave side x1 to the equipment of master side by the returning after the time $T_{s1}$, for example, as shown in FIG. 8, the burst signals ($D_m$, $D_s$) of transmitting and receiving sides are generated at a timing such that the signals are not superposed at the transmitting and receiving local equipments, thereby enabling the two-way time division optical communication.

However, if the burst signal $D_{s2}$ is returned and transmitted after the time $T_{s1}$ in the equipment at the slave side x2 coupled at the ground point that the delay time of the optical fiber line becomes $T_{d2}$, the signal collides with the transmitting burst signal $D_m$ of the master side as readily understood from FIG. 8. Then, in this case, if the delay time of the transmitting burst signal $D_{s2}$ to be returned and output is set to $T_{s2}$, it can be set so that the burst signals transmitted and received at both the equipments do not collide at the transmitting and receiving terminals in the same manner as the equipment of the slave side x1.

The operation of setting the returning timing will be explained according to the embodiment shown in FIG. 4 and FIG. 5.

When the call switch CS of the local transmission equipment 200 of one side is depressed in the state that the equipments 200 of both sides are connected through one optical fiber line 100, the master-slave state setter 2 of the equipment enters a set state. Thus, the second and third switch circuits 15a, 15b are respectively controlled to the M sides. Since a predetermined timing signal ($T_1+T_2$) is supplied from the transmitting time setter (M) to the composition circuit 3 through the third switch circuit 15b, the pieces of transmitting information B, F from the input circuit 1 are input to the composition circuit 3 at the timing signal. At this time, a sign (sync signal bit) representing the sync state through the second switch circuit 15a, a sign representing that the one equipment is a master, and a call signal C from the call signal generator 1b are input to the composition circuit 3 at a predetermining timing, and formed to a burst signal. Then, this transmission burst signal is transmitted to the optical fiber line 100 through the optical transceiver 4.

The equipment installed at the other end of the optical fiber line 100, i.e., the reception side receives the burst signal at the O/E 4b of the transceiver 4, input to the signal processor 8 through the first switch circuit, the decision code bit (D) to become an M/S supervision signal is separated by the decomposition circuit 8d, and the setter 2 is set. Thus, the called equipment is controlled to a slave state. (The called equipment cannot enter a master state until the communication is finished.)

In the equipment which has become the slave side, the timing signal formed by the time set circuit (S) 9 is input to the composition circuit 3 through the switch circuit 15b, the burst signal is returned and transmitted to the equipment of the master side.

The equipment of the master side which has received the returned burst signal inputs the frame bit signal contained in the burst signal to the sync supervision circuit 12 through the decomposition circuit 8d, and compares it with the timing of the time set circuit (M) 13 for setting the timing of the master side burst signal.

Then, when the sync supervision circuit 12 decides that the master burst signal and the burst signal transmitted from the slave side are superposed at one time, a sync bit representing that the burst signal is not synchronized, e.g., "0" is inserted to the composition circuit 3 through the second switch circuit 15a to continue the transmission. Since the equipment of the slave side detects the sync bit "0" in the decomposition circuit 8d and supplies it to the time set circuit (S), it counts the output from the clock extract circuit 8b in the counter provided in the time set circuit (S) 9 while the sync bit "0" continues to displace the transmitting timing by the counted value of the counter, thereby displacing the transmitting timing of the burst signal of the slave side until a synchronization is made.

When the equipment of the master side confirms that the master burst signal and the burst signal transmitted from the slave side indicate completely different time blocks in the sync supervision circuit 12, it decides that synchronization is made and alters the sync bit "0", for example, to "1". Then, it causes a signal "1" of the sycn completion to be transmitted to the equipment of the slave side. Thus, the equipment of the slave side stops the counting operation of the counter in the time set circuit (S) 9 when the sycn completion signal is received, finishes the timing regulation of the output from the time set circuit (S) 9, holds the timing at that time, and enters the communication state for transmitting the burst signal.

Since both equipments detect the reception level by the level detectors 6 and control their own transmitting levels by the detection signals applied to the level controller 7, if the equipments set, for example, the transmitting level to the maximum level at the communication starting time, the optimum transmitting level can be set even in any line length.

More specifically, the transmitting level is controlled, for example, in two stages by the level controller 7, and the level detector 6 can decide whether the input level is proper or not. If proper, the detector outputs the "0" signal, if not, the detector outputs the "1" signal to the controller 7.

Therefore, the equipment of the master side sets the maximum output level at the communication starting time and starts transmitting. When the equipment of the slave side receives the burst signal transmitted from the master side, if the reception level is not proper, the transmitting level from the slave side is set to the low level by the controller 7.

On the other hand, if the equipment of the master side cannot receive the burst signal from the slave side within a predetermined time, it sets the transmitting level to a low level by the controller 7.

Thus, the transmitting levels of the master and slave sides are controlled to suitable levels by this operation, and both equipments can enter the sync operation.

The M/S supervision circuit 11 initially sets the entire system by the system reset circuit 16 when the call buttons CS are simultaneously depressed at both equipments to prevent erroneous operation.

Further, since the sign representing a transmission signal of one side is inserted to both the burst signals during the decision bit period D, the transmission signal of one side as reflected by the connector of the optical line is removed, for example, by the decomposition circuit 8d to prevent the equipment from arriving at an erroneous sync relationship by the reflected signal of its own transmission signal. Further, since near-end crosstalk can be prevented by the first switch circuit 5, the AGC amplifier 8a is prevented from erroneously operating due to the near-end crosstalk of large level from a transmission signal reflected at the connector of the optical line.

When entering the communication state, both voice signals are inserted into the PCM bit period D as PCM signals, and when there is data to be transmitted, the voice signals are inserted into the data bit period F, and transmitted as burst signals.

An example of the configuration of the controller 10 is shown, and the second and third switch circuits 15a, 15b may be, for example, analog switches.

Since the M/S supervision circuit 11 and the system reset circuit 16 are not substantial elements, they may be omitted. Further, the time set circuit (M) 13 and the time set circuit (S) 9 may be formed by the same circuit to be used commonly.

As described above, the two-way time division optical communication system of the present invention can advantageously transmit the burst signal by the operation of the call switch, receive the burst signal from the equipment to become the master side and the master side to control the sync relationship, can be used for any of the equipments of master and slave sides, and can automatically establish the relationship between the master side and the slave sides. Further, since the timing for setting to the two-way communication state can be automatically controlled and the level of the transmission level can be set to the optimum value, the optical transmission system can be advantageously useful when communicating through an optical line having unknown line length used as communication medium.

Moreover, since the transmission burst signal has a function of deciding whether it is a signal originating from its own side or the opposite side signal, the timing is not disturbed by optical reflection signals in the optical line.

What is claimed is:

1. An optical communication set, comprising:
   an optical transmission medium set in an arbitrary optical transmission path length;
   first optical communication terminal station means coupled with one end of said optical transmission medium;
   second optical communication terminal station means coupled with the other end of said optical transmission medium;
   each terminal station means comprising:
   master-slave designating means for generating designating information for designating the associated terminal station as a master side and an opposing terminal station as a slave side at a communication starting time at any of said first and said second optical communication terminal stations;
   transmitting information input means for inputting transmitting information to be transmitted, at the master side or the slave side;
   transmitting time setting means for generating first transmitting time setting information at the master side and second transmitting time setting information at the slave side in response to the designating information;
   sync supervision information outputting means for outputting sync supervision information indicating whether or not the first transmitting time setting information of the master side and the second transmitting time setting information of the slave side have a predetermined synchronizing relationship in response to the designating information;
   composition means for outputting a transmission burst signal of the master or slave side by combining the transmitting information of the master or slave side with the designating information, the first or second transmitting time setting information and the sync supervision information;
   optical transmitting and receiving means for converting the transmission burst signal of the master or slave side into an optical signal to transmit the signal through the optical transmission medium, and for converting a transmission burst signal in the form of an optical signal from the slave or master side into an electric signal when receiving the transmission burst signal;
   decomposition means for separating the designating information, the transmitting information, the first or second transmitting time setting information and the sync supervision signal contained in the received transmission burst signal of the slave or master side;
   first control means for locking the master-slave designating means to a slave state in response to the separated designating information at the slave side;
   second control means for varying the second transmitting time setting information of the slave side during a period indicating that the sync supervision information separated at the slave side does not have said predetermined synchronizing relationship;
   third control means for judging whether or not the first transmitting time setting information and the second transmitting time setting information separated at the master side have a predetermined synchronizing relationship, and for supplying the judged result as said sync supervision information to the sync supervision information outputting means; and
   receiving information outputting means for outputting the transmitting information separated by said decomposition means as receiving information at the master or slave side.

2. The optical communication set according to claim 1, wherein said optical transmission medium is an optical fiber line.

3. The optical communication set according to claim 1, wherein said master-slave designating means comprises a call switch.

4. The optical communication set according to claim 1, wherein said transmitting information input means comprises means for converting analog voice input into a PCM signal.

5. The optical communication set according to claim 4, wherein said transmitting information input means comprises means for combining the PCM signal and directly input digital data.

6. The optical communication set according to claim 3, wherein said each terminal station means comprises means for generating a call signal in response to the call switch, and said composition means combines the call signal with the pieces of information at the combining time.

7. The optical communication set according to claim 1, wherein said transmission burst signal comprises a frame bit and a clock bit generated on the basis of the first or second transmitting time setting information.

8. The optical communication set according to claim 1, wherein said each terminal station means comprises switch means for preventing a transmission burst signal from the opposing terminal station means from being received during transmission of its own burst signal.

9. The optical communication set according to claim 1, wherein said each terminal station means comprises means for controlling the transmission level of its associated burst signal in response to the reception level of the burst signal transmitted to the opposing terminal station means.

10. The optical communication set according to claim 7, wherein said decomposition means comprises means for extracting the clock bit from the received burst signal, and said second control means comprises means for varying the second transmitting time setting information of the slave side by counting the extracted clock bits.

11. The optical communication set according to claim 7, wherein said separated second transmitting time setting information supplied to said third control means is the frame bit.

12. The optical communication set according to claim 1, wherein said each terminal station means comprises means for initializing the optical communication set when the designation of the master side by said master-slave designating means is substantially at the same time at both the associated terminal station means and the opposing terminal station means.

13. The optical communication set according to claim 5, wherein said receiving information outputting means comprises means for separating the PCM signal from the digital data included in the separated transmitted information, and means for converting the separated PCM signal into an analog voice signal.

14. The optical communication set according to claim 6, wherein said decomposition means separates the call signal from the separated burst signal and said receiving information outputting means outputs the separated call signal.

15. The optical communication set according to claim 1, wherein said optical transmitting and receiving means comprises a beam splitter coupled at one end thereof with said transmitting medium.

* * * * *